(12) United States Patent
Chen (10) Patent No.: US 12,069,499 B2
(45) Date of Patent: Aug. 20, 2024

(54) MEASUREMENT METHOD AND DEVICE (71) Applicant: VIVO MOBILE COMMUNICATION CO., LTD., Guangdong (CN)

(72) Inventor: Li Chen, Chang'an Dongguan (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 570 days.

(21) Appl. No.: 17/212,705

(22) Filed: Mar. 25, 2021

(65) Prior Publication Data

US 2021/0211919 A1 Jul. 8, 2021

Related U.S. Application Data (63) Continuation of application No. PCT/CN2019/104345, filed on Sep. 4, 2019.

(30) Foreign Application Priority Data

Sep. 26, 2018 (CN) .......................... 201811126962.6

(51) Int. Cl.
*H04W 24/10* (2009.01)

(52) U.S. Cl.
CPC .................................. *H04W 24/10* (2013.01)

(58) Field of Classification Search
CPC ............................ H04W 24/08; H04B 17/309
USPC ..................................................... 455/422.1
See application file for complete search history.

(56) References Cited

U.S. PATENT DOCUMENTS

| 2003/0007576 A1 | 1/2003 | Alavi et al. |
| 2011/0081868 A1 | 4/2011 | Kim et al. |
| 2011/0188396 A1 | 8/2011 | Jung et al. |
| 2012/0088499 A1* | 4/2012 | Chin ..................... H04W 24/10 455/435.2 |
| 2012/0093093 A1* | 4/2012 | Frenger ................. H04J 11/005 370/329 |
| 2013/0045735 A1* | 2/2013 | Kim ...................... H04W 24/10 455/422.1 |
| 2013/0077700 A1 | 3/2013 | Razazian et al. |
| 2015/0139053 A1 | 5/2015 | Van Lieshout et al. |
| 2016/0112149 A1* | 4/2016 | Kim ..................... H04B 17/309 370/252 |

(Continued)

FOREIGN PATENT DOCUMENTS

| CN | 101656981 A | 2/2010 |
| CN | 102104897 A | 6/2011 |
| CN | 102281552 A | 12/2011 |

(Continued)

OTHER PUBLICATIONS

LG Electronics Inc., "Reporting configuration for DRS measurement," 3GPP TSG-RAN WG2 #87bis, R2-144604, pp. 1-2, (Oct. 10, 2014).

(Continued)

*Primary Examiner* — Fabricio R Murillo Garcia (74) *Attorney, Agent, or Firm* — Brooks Kushman P.C.

(57) ABSTRACT

Some embodiments of this disclosure provide a measurement method and a device. The method includes: performing neighboring cell and/or inter-frequency measurement when a specific cell and/or a specific frequency satisfies a measurement condition, to obtain a measurement result; and reporting part or all content of the measurement result to a network side.

20 Claims, 3 Drawing Sheets (56) References Cited

U.S. PATENT DOCUMENTS

2017/0118701 A1\* 4/2017 Kim ................. H04W 48/16
2017/0294977 A1 10/2017 Uchino et al.

FOREIGN PATENT DOCUMENTS

| CN | 107889151 A | 4/2018 |
|----|-------------|--------|
| WO | 2010/140797 A2 | 12/2010 |
| WO | 2011153910 A1 | 12/2011 |
| WO | 2016121877 A1 | 8/2016 |

OTHER PUBLICATIONS

ITRI, "Discussion on Configuring UE Measurement Report," 3GPP TSG-RAN WG2 #91bis, R2-154376, pp. 1-3, (Oct. 9, 2015).
Written Opinion of the International Searching Authority dated Apr. 8, 2021 as received in Application No. PCT/CN2019/104345.
Japanese Office Action dated Apr. 12, 2022 as received in application No. 2021-517374.
European Search Report dated Sep. 28, 2021, as received in application No. 19865256.2.

\* cited by examiner

MEASUREMENT METHOD AND DEVICE

CROSS-REFERENCE TO RELATED APPLICATIONS

This application is a continuation application of International Application No. PCT/CN2019/104345 filed on Sep. 4, 2019, which claims priority to Chinese Patent Application No. 201811126962.6, filed in China on Sep. 26, 2018, which is incorporated herein by reference in its entirety.

TECHNICAL FIELD

Some embodiments of this disclosure relate to the field of communications technologies, and specifically, to a measurement method and a device.

BACKGROUND

Currently, a terminal performs measurement based on a measurement configuration configured for the terminal by a network side, and then periodically reports a measurement result or performs measurement reporting based on a corresponding event that satisfies a condition.

However, the terminal needs to perform measurement on all cells detected on a frequency corresponding to the measurement configuration, or on all cells of a neighboring cell list. Actually, a lot of measurements are unnecessary, and a network merely uses measurement results of some cells on some frequencies; therefore, it is not conducive to power saving of the terminal.

SUMMARY

An objective of some embodiments of this disclosure is to provide a measurement method and a device, so as to resolve the problem that a measurement manner in the related art is not conducive to power saving of a terminal.

According to a first aspect in some embodiments of this disclosure, a measurement method is provided, applied to a terminal, where the method includes:

performing neighboring cell and/or inter-frequency measurement when a specific cell and/or a specific frequency satisfies a measurement condition, to obtain a measurement result; and reporting part or all content of the measurement result to a network side.

According to a second aspect in some embodiments of this disclosure, a terminal is further provided, including:

a measurement module, configured to perform neighboring cell and/or inter-frequency measurement when a specific cell and/or a specific frequency satisfies a measurement condition, to obtain a measurement result; and a reporting module, configured to report part or all content of the measurement result to a network side.

According to a third aspect in some embodiments of this disclosure, a terminal is further provided, including: a processor, a memory, and a program stored in the memory and capable of running on the processor. When the program is executed by the processor, the steps of the measurement method according to the first aspect are implemented.

According to a fourth aspect in some embodiments of this disclosure, a computer-readable storage medium is further provided. The computer-readable storage medium stores a computer program, and when the computer program is executed by a processor, the steps of the measurement method according to the first aspect are implemented.

In some embodiments of this disclosure, the terminal performs neighboring cell and/or inter-frequency measurement only when the measurement condition is satisfied, so as to implement power saving for the terminal (for example, a stationary or low-speed moving terminal).

BRIEF DESCRIPTION OF DRAWINGS

Other advantages and benefits will become apparent to those of ordinary skill in the art by reading the following detailed descriptions of optional implementations. The accompanying drawings are merely intended to illustrate the purposes of the optional implementations, and should not be construed as a limitation on this disclosure. Throughout the accompanying drawings, the same reference numerals represent the same components. In the accompanying drawings.

DESCRIPTION OF EMBODIMENTS

The following clearly describes the technical solutions in some embodiments of this disclosure with reference to the accompanying drawings in some embodiments of this disclosure. Apparently, the described embodiments are some but not all of the embodiments of this disclosure. All other embodiments obtained by a person of ordinary skill in the art based on the embodiments of this disclosure without creative efforts shall fall within the protection scope of this disclosure.

In the specification and claims of this application, the term "include" and any other variants thereof are intended to cover the non-exclusive inclusion, for example, a process, method, system, product, or device that includes a list of steps or units is not necessarily limited to those expressly listed steps or units, but may include other steps or units not expressly listed or inherent to such a process, method, system, product, or device. In addition, in the specification and claims, the use of "and/or" represents presence of at least one of the connected objects, for example, "A and/or B" indicates the following three cases: A alone, B alone, or both A and B.

In some embodiments of this disclosure, words such as "an example" or "for example" are used to represent an example, an instance, or an illustration. Any embodiment or design scheme described as "an example" or "for example" in some embodiments of this disclosure should not be construed as being more preferred or advantageous than other embodiments or design schemes. To be precise, the words such as "an example" or "for example" are intended to present a related concept in a specific manner.

Techniques described in this specification are not limited to a Long Time Evolution (LTE)/LTE-Advanced (LTE-A) system, and may also be used in various wireless communications systems, such as Code Division Multiple Access (CDMA), Time Division Multiple Access (TDMA), Frequency Division Multiple Access (FDMA), Orthogonal Frequency Division Multiple Access (OFDMA), Single-carrier Frequency-Division Multiple Access (SC-FDMA), and other systems, for example, a fifth generation mobile communications (5th-generation, 5G) system and a later evolved communications system.

The terms "system" and "network" are usually used interchangeably. The CDMA system can implement radio technologies such as CDMA2000 and Universal Terrestrial Radio Access (UTRA). The UTRA includes wideband CDMA (WCDMA) and other CDMA variants. The TDMA system can implement radio technologies such as the Global System for Mobile Communications (GSM). The OFDMA system can implement radio technologies such as ultra mobile broadband (UMB), evolved UTRA (E-UTRA), IEEE 802.11 (Wi-Fi), IEEE 802.16 (WiMAX), IEEE 802.20, and Flash-OFDM. The UTRA and E-UTRA are parts of the Universal Mobile Telecommunications System (UMTS). The LTE and more advanced LTE (such as LTE-A) are new UMTS releases that use the E-UTRA. The UTRA, E-UTRA, UMTS, LTE, LTE-A, and GSM are cited from descriptions of the documentation of the organization named "3rd Generation Partnership Project" (3GPP). The CDMA2000 and UMB are cited from descriptions of the documentation of the organization named "3rd Generation Partnership Project 2" (3GPP2). Techniques described in this specification can be used in the aforementioned systems and radio technologies, and can also be used in other systems and radio technologies.

Figure 1:
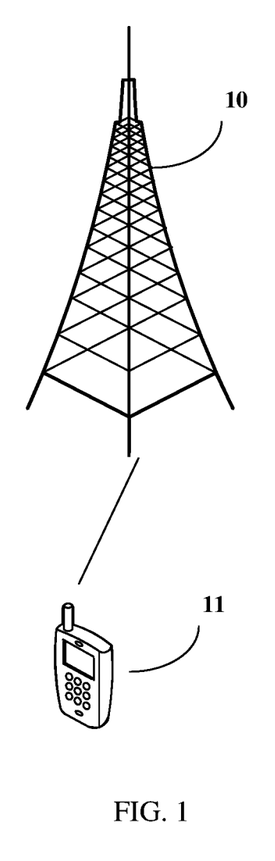
FIG. 1 is a schematic architectural diagram of a wireless communications system according to some embodiments of this disclosure.

The following describes the embodiments of this disclosure with reference to the accompanying drawings. A measurement method and a device provided in some embodiments of this disclosure can be applied to a wireless communications system. FIG. 1 is a schematic architectural diagram of a wireless communications system according to some embodiments of this disclosure. As shown in FIG. 1, the wireless communications system may include a network device 10 and a terminal. The terminal is denoted as user equipment (UE) 11, and the UE 11 may communicate (transmit signaling or transmit data) with the network device 10. In an actual application, connections between the foregoing devices may be wireless connections. To conveniently and intuitively represent a connection relationship between the devices, a solid line is used in FIG. 1. It should be noted that the communications system may include a plurality of UEs 11, and the network device 10 may communicate with the plurality of UEs 11.

The terminal provided in some embodiments of this disclosure may be a mobile phone, a tablet computer, a laptop computer, an ultra-mobile personal computer (UMPC), a netbook, a personal digital assistant (PDA), a mobile Internet device (MID), a wearable device, an in-vehicle device, or the like.

The network device 10 provided in some embodiments of this disclosure may be a base station, and the base station may be a commonly used base station, or may be an evolved base station (eNB), or may be a network device in the 5G system, for example, a device (such as a next-generation base station (gNB) or a transmission and reception point (TRP)).

Figure 2:
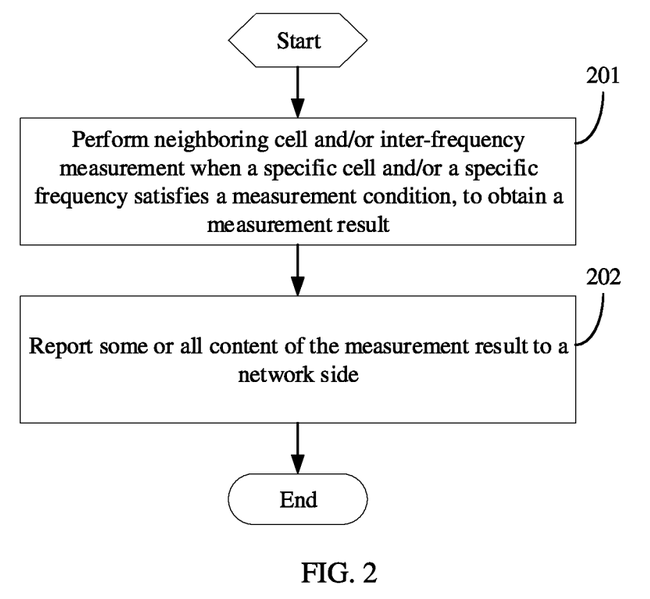
FIG. 2 is a flowchart of a measurement method according to some embodiments of this disclosure.

Referring to FIG. 2, some embodiments of this disclosure provide a measurement method, and the method may be executed by a terminal. Specific steps are as follows:

Step 201: Perform neighboring cell and/or inter-frequency measurement when a specific cell and/or a specific frequency satisfies a measurement condition, to obtain a measurement result.

For example, the terminal may determine whether one or more cells and/or frequencies satisfy the measurement condition, and determine a cell and/or frequency that satisfies the measurement condition as the specific cell and/or frequency. It can be understood that a quantity and type of specific cells and/or specific frequencies are not specifically limited in some embodiments of this disclosure.

Step 202: Report part or all content of the measurement result to a network side.

The measurement condition is a condition under which measurement needs to be performed on a cell and/or frequency. That the specific cell and/or specific frequency in step 201 satisfy/satisfies the measurement condition means: the specific cell and/or specific frequency satisfy/satisfies the condition under which measurement needs to be performed. Certainly, it can be understood that specific content of the measurement condition is not limited in some embodiments of this disclosure.

For example, the measurement condition may include any one of the following:

(1) Measurement performance of a serving cell is greater than or less than a preset threshold.

It can be understood that the measurement performance of the serving cell being greater than the preset threshold and the measurement performance of the serving cell being less than the preset threshold may correspond to different measurement conditions, and different measurement conditions may correspond to different measurement ranges. For example, being greater than the preset threshold may reduce a measurement range or a measurement quantity, and being less than the preset threshold may increase a measurement range or a measurement quantity. This holds true in the following situations and is not repeated herein.

(2) Measurement performance of an intra-frequency neighboring cell is greater than or less than a preset threshold.

(3) A quantity of cells whose measurement performance is less than or greater than a preset threshold in intra-frequency neighboring cells is greater than or less than a preset quantity.

Equivalently, the quantity of cells whose measurement performance is less than or greater than the preset threshold in the intra-frequency neighboring cells is greater than the preset quantity; or the quantity of cells whose measurement performance is less than or greater than the preset threshold in the intra-frequency neighboring cells is less than the preset quantity.

(4) Measurement performance of a cell of a preset group is greater than or less than a preset threshold.

(5) A quantity of cells whose measurement performance is less than or greater than a preset threshold in cells of a preset group is greater than or less than a preset quantity.

(6) Measurement performance of an inter-frequency cell is greater than or less than a preset threshold.

(7) A quantity of cells whose measurement performance is less than or greater than a preset threshold in inter-frequency cells is greater than or less than a preset quantity.

(8) Measurement performance of a frequency of a preset group is greater than or less than a preset threshold.

(9) A quantity of cells whose measurement performance is less than or greater than a preset threshold on frequencies of a preset group is greater than or less than a preset quantity.

(10) Measurement performance of an inter-radio access technology (RAT) cell is greater than or less than a preset threshold.

(11) A quantity of cells whose measurement performance is less than or greater than a preset threshold in inter-RAT cells is greater than or less than a preset quantity.

(12) Measurement performance in a RAT of a preset group is greater than or less than a preset threshold.

(13) A quantity of cells whose measurement performance is less than or greater than a preset threshold in RATs of a preset group is greater than or less than a preset quantity.

It can be understood that the measurement performance in some embodiments of this disclosure may include: reference signal received power (RSRP), reference signal received quality (RSRQ), signal to interference plus noise ratio (SINR), channel quality indication (CQI), and the like.

It can be understood that a reference signal in some embodiments of this disclosure may be a synchronization signal (SSB), a channel state information reference signal (CSI-RS), a demodulation reference signal (DMRS), or other newly defined reference signals.

It can be understood that in some embodiments of this disclosure, specific content such as a preset threshold, a preset quantity, a preset group, and the like are not limited and can be set based on specific conditions.

In some embodiments of this disclosure, optionally, before the performing measurement on the specific cell and/or the specific frequency when the specific cell and/or the specific frequency satisfies the measurement condition, to obtain the measurement result, the method may further include: receiving the measurement condition from the network side; or receiving a measurement configuration and a measurement condition corresponding to the measurement configuration from the network side, that is, receiving both the measurement configuration and the measurement condition from the network side.

In some embodiments of this disclosure, optionally, the measurement condition may be specified by a protocol, or the measurement condition is a predefined condition.

It can be understood that, in some embodiments of this disclosure, the measurement condition may be predefined, or specified by the protocol, or configured by the network side.

In some embodiments of this disclosure, optionally, different measurement conditions may correspond to different measurement ranges. In this way, whether each measurement range satisfies its corresponding measurement condition can be determined, so as to effectively control the measurement range of the terminal and implement power saving for the terminal.

Optionally, the measurement range corresponding to the measurement condition may include at least one of the following:
(1) one or more cells;
(2) one or more cell groups;
(3) one or more frequencies;
(4) one or more frequency ranges;
(5) one or more frequency groups;
(6) one or more frequency range groups;
(7) one or more radio access technologies (RAT);
(8) one or more measurement performance;
(9) one or more reference signals (RS);
(10) one or more reference signal sets (RS set); and
(11) one or more beams.

For example, (1) a measurement condition A corresponds to different cells, and the terminal may measure the measurement condition A corresponding to different cells. (2) A measurement condition B corresponds to different cell groups, and the terminal may measure the measurement condition B corresponding to different cell groups. (3) A measurement condition C corresponds to different frequencies or frequency ranges, and the terminal may measure the measurement condition C corresponding to different frequencies or frequency ranges. (4) A measurement condition D corresponds to different frequency groups or frequency range groups, and the terminal may measure the measurement condition D corresponding to different frequency groups or frequency range groups. (5) The measurement condition D corresponds to different RATs, and the terminal may measure the measurement condition D corresponding to different RATs. (6) A measurement condition E corresponds to different measurement performance (RSRP, RSRQ, or SINR), and the terminal may measure the measurement condition E corresponding to different measurement performance (RSRP, RSRQ, or SINR). (7) The measurement condition E corresponds to different reference signals (RS), different reference signal sets (RS set), or different beams, and the terminal may measure the measurement condition E corresponding to different reference signals (RS), different reference signal sets (RS set), or different beams.

It can be understood that a quantity of cells, a quantity of cell groups, a quantity of frequencies or frequency ranges, a quantity of frequency groups or frequency range groups, a quantity of RATs, a quantity of measurement performance, a quantity of reference signal sets, and a quantity of beams in the measurement range corresponding to the measurement condition are not specifically limited in some embodiments of this disclosure.

In some embodiments of this disclosure, optionally, the performing neighboring cell and/or inter-frequency measurement includes any one or a combination of the following:
(1) performing measurement on an intra-frequency neighboring cell;
(2) performing measurement on an inter-frequency cell;
(3) performing measurement on an inter-RAT cell;
(4) performing measurement on a cell of a preset group;
(5) performing measurement on a frequency of a preset group;
(6) performing measurement on a first preset quantity of cells;
(7) performing measurement on a second preset quantity of frequencies; and
(8) performing measurement on a cell, frequency, and/or RAT that satisfy/satisfies the measurement condition.

It can be understood that the first preset quantity, the second preset quantity, and specific content of the preset group are not limited in some embodiments of this disclosure.

In some embodiments of this disclosure, optionally, the performing neighboring cell and/or inter-frequency measurement further includes: performing measurement on the serving.

In some embodiments of this disclosure, optionally, the performing measurement on the serving includes: performing measurement on a reference signal, a reference signal set, and/or a beam in the serving.

In some embodiments of this disclosure, optionally, the performing measurement on the intra-frequency neighboring cell includes: performing measurement on a reference signal, a reference signal set, and/or a beam in the intra-frequency neighboring cell.

In some embodiments of this disclosure, optionally, the performing measurement on the inter-frequency cell includes: performing measurement on a reference signal, a reference signal set, and/or a beam in the inter-frequency cell.

In some embodiments of this disclosure, optionally, the performing measurement on the inter-RAT cell includes: performing measurement on a reference signal, a reference signal set, and/or a beam in the inter-RAT cell.

In some embodiments of this disclosure, optionally, the performing measurement on the cell of the preset group includes: performing measurement on a reference signal, a reference signal set, and/or a beam in the cell of the preset group.

In some embodiments of this disclosure, optionally, the performing measurement on the frequency of the preset group includes: performing measurement on a reference signal, a reference signal set, and/or a beam corresponding to a cell that is detected on the frequency of the preset group.

In some embodiments of this disclosure, optionally, the performing measurement on the RAT that satisfies the measurement condition includes:

performing measurement on a reference signal, a reference signal set, and/or a beam corresponding to a cell that is detected in the RAT satisfying the measurement condition.

In some embodiments of this disclosure, optionally, the reporting the part or all content of the measurement result to the network side includes:

reporting the part or all content of the measurement result to the network side when the measurement result satisfies a measurement reporting condition;

or periodically reporting the part or all content of the measurement result to the network side;

or reporting the part or all content of the measurement result to the network side when a reporting event is satisfied;

The measurement reporting condition may be reporting when predetermined measurement performance satisfies a specific condition.

In some embodiments of this disclosure, optionally, before the reporting the part or all content of the measurement result to the network side when the part or all content of the measurement result satisfies the measurement reporting condition, the method further includes: receiving the measurement reporting condition from the network side; or receiving a measurement configuration and a measurement reporting condition corresponding to the measurement configuration from the network side.

In some embodiments of this disclosure, optionally, the measurement reporting condition includes one or more of the following:

(1) Measurement performance of a serving cell is greater than or less than a first preset threshold.

(2) Measurement performance of an intra-frequency neighboring cell is greater than or less than a second preset threshold.

(3) A quantity of cells whose measurement performance is less than or greater than a third preset threshold in intra-frequency neighboring cells is greater than or less than a third preset quantity.

Equivalently, the quantity of cells whose measurement performance is less than or greater than the third preset threshold in the intra-frequency neighboring cells is greater than the third preset quantity; or the quantity of cells whose measurement performance is less than or greater than the third preset threshold in the intra-frequency neighboring cells is less than the third preset quantity.

(4) Measurement performance of a cell of a preset group is greater than or less than a fourth preset threshold.

(5) A quantity of cells whose measurement performance is less than or greater than a fifth preset threshold in cells of a preset group is greater than or less than a fourth preset quantity.

Equivalently, the quantity of cells whose measurement performance is less than or greater than the fifth preset threshold in the cells of the preset group is greater than the fourth preset quantity; or the quantity of cells whose measurement performance is less than or greater than the fifth preset threshold in the cells of the preset group is less than the fourth preset quantity.

(6) Measurement performance of an inter-frequency cell is greater than or less than a sixth preset threshold.

(7) A quantity of cells whose measurement performance is less than or greater than a seventh preset threshold in inter-frequency cells is greater than or less than a fifth preset quantity.

Equivalently, the quantity of cells whose measurement performance is less than or greater than the seventh preset threshold in the inter-frequency cells is greater than the fifth preset quantity; or the quantity of cells whose measurement performance is less than or greater than the seventh preset threshold in the inter-frequency cells is less than the fifth preset quantity;

(8) measurement performance of a frequency of a preset group is greater than or less than an eighth preset threshold.

(9) A quantity of cells whose measurement performance is less than or greater than a ninth preset threshold on frequencies of a preset group is greater than or less than a sixth preset quantity.

Equivalently, the quantity of cells whose measurement performance is less than or greater than the ninth preset threshold on the frequencies of the preset group is greater than the sixth preset quantity; or the quantity of cells whose measurement performance is less than or greater than the ninth preset threshold on the frequencies of the preset group is less than the sixth preset quantity.

(10) Measurement performance of an inter-RAT cell is greater than or less than a tenth preset threshold.

(11) A quantity of cells whose measurement performance is less than or greater than an eleventh preset threshold in inter-RAT cells is greater than or less than a seventh preset quantity.

Equivalently, the quantity of cells whose measurement performance is less than or greater than the eleventh preset threshold in the inter-RAT cells is greater than the seventh preset quantity; or the quantity of cells whose measurement performance is less than or greater than the eleventh preset threshold in the inter-RAT cells is less than the seventh preset quantity.

(12) Measurement performance in a RAT of a preset group is greater than or less than a twelfth preset threshold.

(13) A quantity of cells whose measurement performance is less than or greater than a thirteenth preset threshold in RATs of a preset group is greater than or less than an eighth preset quantity.

Equivalently, the quantity of cells whose measurement performance is less than or greater than the thirteenth preset threshold in the RATs of the preset group is greater than the eighth preset quantity; or the quantity of cells whose measurement performance is less than or greater than the thirteenth preset threshold in the RATs of the preset group is less than the eighth preset quantity.

It can be understood that specific values of the first preset threshold, the second preset threshold, the third preset threshold, the third preset quantity, the fourth preset threshold, the fifth preset threshold, the fourth preset quantity, the sixth preset threshold, the fifth preset quantity, the seventh preset threshold, the eighth preset threshold, the ninth preset threshold, the sixth preset quantity, the ten preset threshold, the seventh preset quantity, the eleventh preset threshold, the twelfth preset threshold, the thirteenth preset threshold, and the eighth preset quantity are not limited in some embodiments of this disclosure.

It should be noted that the foregoing measurement reporting conditions are different from measurement reporting events in the related art, and the two can be used in combination. For example, if a measurement reporting event is satisfied, the terminal triggers reporting. However, based on different measurement reporting conditions, measurement performance of different quantities of cells is reported.

In some embodiments of this disclosure, optionally, the part or all content of the measurement result includes one or more of the following:
(1) measurement performance of an intra-frequency neighboring cell;
(2) measurement performance of an intra-frequency neighboring cell that satisfies the measurement condition;
(3) measurement performance of an inter-frequency cell;
(4) measurement performance of an inter-frequency cell that satisfies the measurement condition;
(5) measurement performance of an inter-RAT cell;
(6) measurement performance of an inter-RAT cell that satisfies the measurement condition;
(7) measurement performance of a cell of a preset group; and
(8) measurement performance of a cell of a preset group that satisfies the measurement condition.

In some embodiments of this disclosure, optionally, the measurement result may further include: measurement performance of the serving cell.

In some embodiments of this disclosure, the terminal performs neighboring cell and/or inter-frequency measurement only when the measurement condition is satisfied, so as to implement power saving for the terminal (for example, a stationary or low-speed moving terminal).

Some embodiments of this disclosure further provide a terminal. A problem resolving principle of the terminal is similar to the measurement method in some embodiments of this disclosure; therefore, implementation of the terminal may be referred to implementation of the method, and details are not described herein again.

Figure 3:
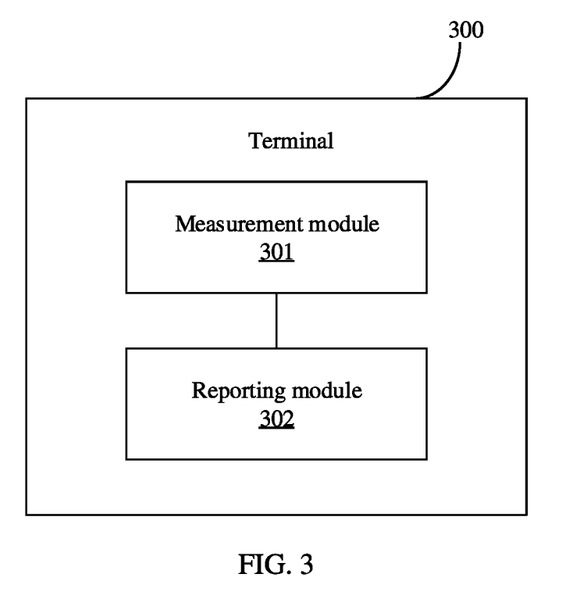
FIG. 3 is a schematic structural diagram 1 of a terminal according to some embodiments of this disclosure.

Referring to FIG. 3, some embodiments of this disclosure further provide a terminal, and the terminal 300 includes:
a measurement module 301, configured to perform neighboring cell and/or inter-frequency measurement when a specific cell and/or a specific frequency satisfies a measurement condition, to obtain a measurement result; and
a reporting module 302, configured to report part or all content of the measurement result to a network side.

In some embodiments of this disclosure, optionally, the terminal 300 further includes: a first receiving module, configured to receive the measurement condition from the network side; or receive a measurement configuration and a measurement condition corresponding to the measurement configuration from the network side.

In some embodiments of this disclosure, optionally, the measurement condition is specified by a protocol, or the measurement condition is a predefined condition, or the measurement condition is configured by the network side.

In some embodiments of this disclosure, optionally, a measurement range corresponding to the measurement condition includes one or more of the following:
(1) one or more cells;
(2) one or more cell groups;
(3) one or more frequencies;
(4) one or more frequency ranges;
(5) one or more frequency groups;
(6) one or more frequency range groups;
(7) one or more radio access technologies (RAT);
(8) one or more measurement performance;
(9) one or more reference signals (RS);
(10) one or more reference signal sets (RS set); and
(11) one or more beams.

In some embodiments of this disclosure, optionally, the performing neighboring cell and/or inter-frequency measurement includes any one or a combination of the following:
(1) performing measurement on an intra-frequency neighboring cell;
(2) performing measurement on an inter-frequency cell;
(3) performing measurement on an inter-RAT cell;
(4) performing measurement on a cell of a preset group;
(5) performing measurement on a frequency of a preset group;
(6) performing measurement on a first preset quantity of cells;
(7) performing measurement on a second preset quantity of frequencies; and
(8) performing measurement on a cell, frequency, and/or RAT that satisfy/satisfies the measurement condition.

It can be understood that the first preset quantity, the second preset quantity, and specific content of the preset group are not limited in some embodiments of this disclosure.

In some embodiments of this disclosure, optionally, the performing neighboring cell and/or inter-frequency measurement further includes: performing measurement on a serving cell.

In some embodiments of this disclosure, optionally, the performing measurement on the serving cell includes: performing measurement on a reference signal, a reference signal set, and/or a beam in the serving cell.

In some embodiments of this disclosure, optionally, the performing measurement on the intra-frequency neighboring cell includes: performing measurement on a reference signal, a reference signal set, and/or a beam in the intra-frequency neighboring cell.

In some embodiments of this disclosure, optionally, the performing measurement on the inter-frequency cell includes: performing measurement on a reference signal, a reference signal set, and/or a beam in the inter-frequency cell.

In some embodiments of this disclosure, optionally, the performing measurement on the inter-RAT cell includes: performing measurement on a reference signal, a reference signal set, and/or a beam in the inter-RAT cell.

In some embodiments of this disclosure, optionally, the performing measurement on the cell of the preset group includes: performing measurement on a reference signal, a reference signal set, and/or a beam in the cell of the preset group.

In some embodiments of this disclosure, optionally, the performing measurement on the frequency of the preset group includes: performing measurement on a reference signal, a reference signal set, and/or a beam corresponding to a cell that is detected on the frequency of the preset group.

In some embodiments of this disclosure, optionally, the performing measurement on the RAT that satisfies the measurement condition includes: performing measurement on a reference signal, a reference signal set, and/or a beam corresponding to a cell that is detected in the RAT satisfying the measurement condition.

In some embodiments of this disclosure, optionally, the reporting module is further configured to:

report the part or all content of the measurement result to the network side when the part or all content of the measurement result satisfies a measurement reporting condition;
or periodically report the part or all content of the measurement result to the network side;
or report the part or all content of the measurement result to the network side when a reporting event is satisfied;

In some embodiments of this disclosure, optionally, the terminal 300 further includes: a second receiving module, configured to receive the measurement reporting condition from the network side; or configured to receive a measurement configuration and a measurement reporting condition corresponding to the measurement configuration from the network side.

In some embodiments of this disclosure, optionally, the measurement reporting condition includes one or more of the following:

(1) Measurement performance of the serving cell is greater than or less than a first preset threshold.

(2) Measurement performance of an intra-frequency neighboring cell is greater than or less than a second preset threshold.

(3) A quantity of cells whose measurement performance is less than or greater than a third preset threshold in intra-frequency neighboring cells is greater than or less than a third preset quantity.

Equivalently, the quantity of cells whose measurement performance is less than or greater than the third preset threshold in the intra-frequency neighboring cells is greater than the third preset quantity; or the quantity of cells whose measurement performance is less than or greater than the third preset threshold in the intra-frequency neighboring cells is less than the third preset quantity.

(4) Measurement performance of a cell of a preset group is greater than or less than a fourth preset threshold.

(5) A quantity of cells whose measurement performance is less than or greater than a fifth preset threshold in cells of a preset group is greater than or less than a fourth preset quantity.

Equivalently, the quantity of cells whose measurement performance is less than or greater than the fifth preset threshold in the cells of the preset group is greater than the fourth preset quantity; or the quantity of cells whose measurement performance is less than or greater than the fifth preset threshold in the cells of the preset group is less than the fourth preset quantity.

(6) Measurement performance of an inter-frequency cell is greater than or less than a sixth preset threshold.

(7) A quantity of cells whose measurement performance is less than or greater than a seventh preset threshold in inter-frequency cells is greater than or less than a fifth preset quantity.

Equivalently, the quantity of cells whose measurement performance is less than or greater than the seventh preset threshold in the inter-frequency cells is greater than the fifth preset quantity; or the quantity of cells whose measurement performance is less than or greater than the seventh preset threshold in the inter-frequency cells is less than the fifth preset quantity;

(8) measurement performance of a frequency of a preset group is greater than or less than an eighth preset threshold;

(9) A quantity of cells whose measurement performance is less than or greater than a ninth preset threshold on frequencies of a preset group is greater than or less than a sixth preset quantity.

Equivalently, the quantity of cells whose measurement performance is less than or greater than the ninth preset threshold on the frequencies of the preset group is greater than the sixth preset quantity; or the quantity of cells whose measurement performance is less than or greater than the ninth preset threshold on the frequencies of the preset group is less than the sixth preset quantity.

(10) Measurement performance of an inter-RAT cell is greater than or less than a tenth preset threshold.

(11) A quantity of cells whose measurement performance is less than or greater than an eleventh preset threshold in inter-RAT cells is greater than or less than a seventh preset quantity.

Equivalently, the quantity of cells whose measurement performance is less than or greater than the eleventh preset threshold in the inter-RAT cells is greater than the seventh preset quantity; or the quantity of cells whose measurement performance is less than or greater than the eleventh preset threshold in the inter-RAT cells is less than the seventh preset quantity.

(12) Measurement performance in a RAT of a preset group is greater than or less than a twelfth preset threshold.

(13) A quantity of cells whose measurement performance is less than or greater than a thirteenth preset threshold in RATs of a preset group is greater than or less than an eighth preset quantity.

Equivalently, the quantity of cells whose measurement performance is less than or greater than the thirteenth preset threshold in the RATs of the preset group is greater than the eighth preset quantity; or the quantity of cells whose measurement performance is less than or greater than the thirteenth preset threshold in the RATs of the preset group is less than the eighth preset quantity.

In some embodiments of this disclosure, optionally, the part or all content of the measurement result includes one or more of the following:

(1) measurement performance of an intra-frequency neighboring cell;
(2) measurement performance of an intra-frequency neighboring cell that satisfies the measurement condition;
(3) measurement performance of an inter-frequency cell;
(4) measurement performance of an inter-frequency cell that satisfies the measurement condition;
(5) measurement performance of an inter-RAT cell;
(6) measurement performance of an inter-RAT cell that satisfies the measurement condition;
(7) measurement performance of a cell of a preset group; and
(8) measurement performance of a cell of a preset group that satisfies the measurement condition.

In some embodiments of this disclosure, optionally, the measurement result may further include: measurement performance of the serving cell.

The terminal provided in some embodiments of this disclosure may execute the foregoing method embodiment, implementation principles and technical effects thereof are similar, and details are not described herein again in this embodiment.

Figure 4:
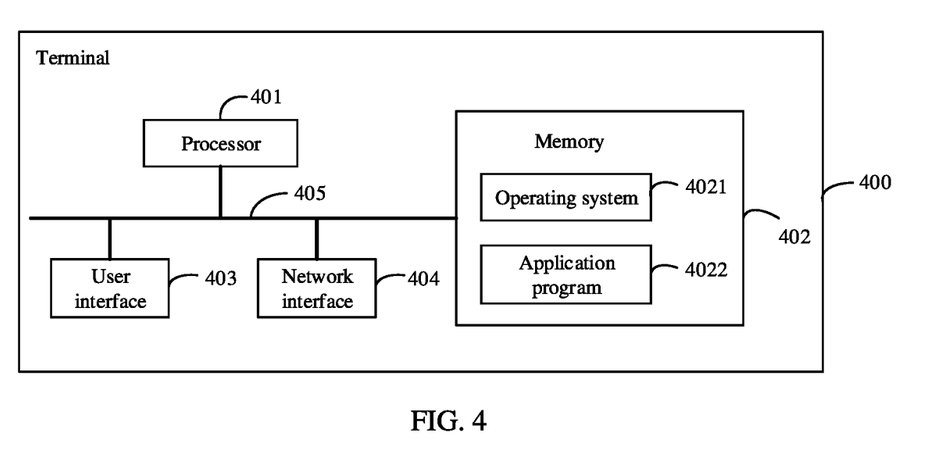
FIG. 4 is a schematic structural diagram 2 of a terminal according to some embodiments of this disclosure.

As shown in FIG. 4, the terminal 400 shown in FIG. 4 includes at least one processor 401, a memory 402, at least one network interface 404, and a user interface 403. The components of the terminal 400 are coupled together by using a bus system 405. It can be understood that the bus system 405 is configured to implement connection communication between these components. The bus system 405 may include not only a data bus but also a power supply bus, a control bus, and a status signal bus. However, for clear description, various buses in FIG. 4 are marked as the bus system 405.

The user interface 403 may include a display, a keyboard, a click device (for example, a mouse or a trackball), a touch board, or a touchscreen.

It can be understood that the memory 402 in some embodiments of this disclosure may be a volatile memory or a non-volatile memory, or may include both a volatile memory and a non-volatile memory. The non-volatile memory may be a read-only memory (ROM), a programmable read-only memory (PROM), an erasable programmable read-only memory (Erasable PROM, EPROM), an electrically erasable programmable read-only memory (Electrically EPROM, EEPROM), or a flash memory. The volatile memory may be a random access memory (RAM), and serves as an external cache. As exemplary rather than restrictive description, many forms of RAM can be used, such as a static random access memory (Static RAM, SRAM), a dynamic random access memory (Dynamic RAM, DRAM), a synchronous dynamic random access memory (Synchronous DRAM, SDRAM), a double data rate synchronous dynamic random access memory (Double Data Rate SDRAM, DDRSDRAM), an enhanced synchronous dynamic random access memory (Enhanced SDRAM, ESDRAM), a synchronous link dynamic random access memory (Synchlink DRAM, SLDRAM), and a direct Rambus random access memory (Direct Rambus RAM, DRRAM). The memory 402 in the system and method described in some embodiments of this disclosure is intended to include but is not limited to these and any other appropriate types of memories.

In some implementations, the memory 402 stores the following elements: an executable module or a data structure, or a subset thereof, or an extended set thereof: an operating system 4021 and an application program 4022.

The operating system 4021 includes various system programs, such as a framework layer, a kernel library layer, and a driver layer, and is configured to implement various basic services and process hardware-based tasks. The application program 4022 includes various application programs, such as a media player, and a browser, and is configured to implement various application services. A program that implements the methods of some embodiments of this disclosure may be included in the application program 4022.

In an embodiment of this disclosure, an program or instruction stored in the memory 402 is invoked, specifically, a program or instruction stored in the application program 4022 may be invoked. When the program or instruction is executed, the following steps are implemented: performing neighboring cell and/or inter-frequency measurement when a specific cell and/or a specific frequency satisfies a measurement condition, to obtain a measurement result; and reporting part or all content of the measurement result to a network side. The terminal provided in some embodiments of this disclosure may execute the foregoing method embodiment, implementation principles and technical effects thereof are similar, and details are not described herein again in this embodiment.

The steps of the method or algorithm described with reference with content disclosed in this disclosure may be implemented in a hardware manner, or may be implemented in a manner in which a processor executes software instructions. A software instruction may include corresponding software module, and the software module may be stored in a RAM, a flash memory, a ROM, an EPROM, an EEPROM, a register, a hard disk, a removable hard disk, a compact disc read-only memory, or any other form of storage medium well known in the art. For example, a storage medium is coupled to a processor, so that the processor can read information from the storage medium or write information into the storage medium. Certainly, the storage medium may alternatively be a component of the processor. The processor and the storage medium may be located in an ASIC. In addition, the ASIC may be located in a core-network interface device. Certainly, the processor and the storage medium may alternatively exist in the core network interface device as discrete components.

A person of skill in the art should be able to realize that in one or more of the foregoing examples, the functions described in this disclosure may be implemented by using hardware, software, firmware, or any combination thereof. When the functions are implemented by software, the functions may be stored in a computer-readable medium or transmitted as one or more instructions or code in the computer-readable medium. The computer-readable medium includes a computer storage medium and a communications medium, where the communications medium includes any medium that enables a computer program to be transmitted from one place to another. The storage medium may be any available medium accessible to a general-purpose or dedicated computer.

The objectives, technical solutions, and benefits of this disclosure are further described in detail in the foregoing specific embodiments. It should be understood that the foregoing descriptions are only specific embodiments of this disclosure, but are not intended to limit the protection scope of this disclosure. Any modification, equivalent replacement, or improvement made within the spirit and principle of this disclosure shall fall within the protection scope of this disclosure.

A person skilled in the art should understand that the embodiments of this disclosure may be provided as a method, a system, or a computer program product. Therefore, some embodiments of this disclosure may use a form of hardware only embodiments, software only embodiments, or embodiments with a combination of software and hardware. Moreover, some embodiments of this disclosure may use a form of a computer program product that is implemented on one or more computer-usable storage media (including but not limited to a disk memory, a CD-ROM, an optical memory, and the like) that include computer-usable program code.

Some embodiments of this disclosure are described with reference to the flowcharts and/or block diagrams of the method, the device (system), and the computer program product according to some embodiments of this disclosure. It should be understood that computer program instructions may be used to implement each process and/or each block in the flowcharts and/or the block diagrams, or a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer-readable memory that can instruct the computer or any other programmable data processing device to work in a specific manner, so that the instructions stored in the computer-readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Obviously, a person skilled in the art can make various modifications and variations to some embodiments of this disclosure without departing from the spirit and scope of this disclosure. This disclosure is intended to cover these modifications and variations provided that the modifications and variations in some embodiments of this disclosure fall within the protection scope defined by the following claims and their equivalent technologies.

What is claimed is:

1. A measurement method, applied to a terminal, wherein the measurement method comprises:
    performing neighboring cell and/or inter-frequency measurement only when a cell and/or a frequency satisfies a measurement condition, to obtain a measurement result; and
    reporting part or all content of the measurement result to a network side when the part or all content of the measurement result satisfies a measurement reporting condition;
    wherein the measurement condition comprises:
    measurement performance of a serving cell is greater than or less than a preset threshold;
    measurement performance of an intra-frequency neighboring cell is greater than or less than a preset threshold;
    a quantity of cells whose measurement performance is less than or greater than a preset threshold in intra-frequency neighboring cells is greater than or less than a preset quantity;
    measurement performance of a cell of a preset group is greater than or less than a preset threshold;
    a quantity of cells whose measurement performance is less than or greater than a preset threshold in cells of a preset group is greater than or less than a preset quantity;
    measurement performance of an inter-frequency cell is greater than or less than a preset threshold;
    a quantity of cells whose measurement performance is less than or greater than a preset threshold in inter-frequency cells is greater than or less than a preset quantity;
    measurement performance of a frequency of a preset group is greater than or less than a preset threshold;
    a quantity of cells whose measurement performance is less than or greater than a preset threshold on frequencies of a preset group is greater than or less than a preset quantity;
    measurement performance of an inter-radio access technology (RAT) cell is greater than or less than a preset threshold;
    a quantity of cells whose measurement performance is less than or greater than a preset threshold in inter-RAT cells is greater than or less than a preset quantity;
    measurement performance in a RAT of a preset group is greater than or less than a preset threshold;
    a quantity of cells whose measurement performance is less than or greater than a preset threshold in RATs of a preset group is greater than or less than a preset quantity.

2. The measurement method according to claim 1, wherein before the performing neighboring cell and/or inter-frequency measurement only when the cell and/or the frequency satisfies the measurement condition, to obtain the measurement result, the measurement method further comprises:
    receiving the measurement condition from the network side;
    or
    receiving a measurement configuration and the measurement condition corresponding to the measurement configuration from the network side.

3. The measurement method according to claim 1, wherein a measurement range corresponding to the measurement condition comprises at least one of:
    one or more cells;
    one or more cell groups;
    one or more frequencies;
    one or more frequency ranges;
    one or more frequency groups;
    one or more frequency range groups;
    one or more radio access technologies (RAT);
    one or more measurement performance;
    one or more reference signals;
    one or more reference signal sets; and
    one or more beams.

4. The measurement method according to claim 1, wherein the performing neighboring cell and/or inter-frequency measurement comprises any one or a combination of:
    performing measurement on an intra-frequency neighboring cell;
    performing measurement on an inter-frequency cell;
    performing measurement on an inter-radio access technology (RAT) cell;
    performing measurement on a cell of a preset group;
    performing measurement on a frequency of a preset group;
    performing measurement on a first preset quantity of cells;
    performing measurement on a second preset quantity of frequencies; and
    performing measurement on a cell, frequency, and/or RAT that satisfy/satisfies the measurement condition.

5. The measurement method according to claim 4, wherein
    the performing measurement on the intra-frequency neighboring cell comprises:
    performing measurement on a reference signal, a reference signal set, and/or a beam in the intra-frequency neighboring cell;
    or
    the performing measurement on the inter-frequency cell comprises:
    performing measurement on a reference signal, a reference signal set, and/or a beam in the inter-frequency cell;
    or the performing measurement on the inter-RAT cell comprises:
performing measurement on a reference signal, a reference signal set, and/or a beam in the inter-RAT cell;
or
the performing measurement on the cell of the preset group comprises:
performing measurement on a reference signal, a reference signal set, and/or a beam in the cell of the preset group;
or
the performing measurement on the frequency of the preset group comprises:
performing measurement on a reference signal, a reference signal set, and/or a beam corresponding to a cell that is detected on the frequency of the preset group;
or
the performing measurement on the RAT that satisfies the measurement condition comprises:
performing measurement on a reference signal, a reference signal set, and/or a beam corresponding to a cell that is detected in the RAT satisfying the measurement condition.

6. The measurement method according to claim 1, wherein before the reporting the part or all content of the measurement result to the network side when the part or all content of the measurement result satisfies a measurement reporting condition, the measurement method further comprises:
receiving the measurement reporting condition from the network side;
or
receiving a measurement configuration and a measurement reporting condition corresponding to the measurement configuration from the network side.

7. The measurement method according to claim 6, wherein the measurement reporting condition comprises one of:
measurement performance of a serving cell is greater than or less than a first preset threshold;
measurement performance of an intra-frequency neighboring cell is greater than or less than a second preset threshold;
a quantity of cells whose measurement performance is less than or greater than a third preset threshold in intra-frequency neighboring cells is greater than a third preset quantity;
a quantity of cells whose measurement performance is less than or greater than the third preset threshold in the intra-frequency neighboring cells is less than the third preset quantity;
measurement performance of a cell of a preset group is greater than or less than a fourth preset threshold;
a quantity of cells whose measurement performance is less than or greater than a fifth preset threshold in cells of a preset group is greater than a fourth preset quantity;
a quantity of cells whose measurement performance is less than or greater than the fifth preset threshold in the cells of the preset group is less than the fourth preset quantity;
measurement performance of an inter-frequency cell is greater than or less than a sixth preset threshold;
a quantity of cells whose measurement performance is less than or greater than a seventh preset threshold in inter-frequency cells is greater than a fifth preset quantity;
a quantity of cells whose measurement performance is less than or greater than the seventh preset threshold in the inter-frequency cells is less than the fifth preset quantity;
measurement performance of a frequency of a preset group is greater than or less than an eighth preset threshold;
a quantity of cells whose measurement performance is less than or greater than a ninth preset threshold on frequencies of a preset group is greater than a sixth preset quantity;
a quantity of cells whose measurement performance is less than or greater than the ninth preset threshold on the frequencies of the preset group is less than the sixth preset quantity;
measurement performance of an inter-RAT cell is greater than or less than a tenth preset threshold;
a quantity of cells whose measurement performance is less than or greater than an eleventh preset threshold in inter-RAT cells is greater than a seventh preset quantity;
a quantity of cells whose measurement performance is less than or greater than the eleventh preset threshold in the inter-RAT cells is less than the seventh preset quantity;
measurement performance in a RAT of a preset group is greater than or less than a twelfth preset threshold;
a quantity of cells whose measurement performance is less than or greater than a thirteenth preset threshold in RATs of a preset group is greater than an eighth preset quantity; and
a quantity of cells whose measurement performance is less than or greater than the thirteenth preset threshold in the RATs of the preset group is less than the eighth preset quantity.

8. The measurement method according to claim 1, wherein the part or all content of the measurement result comprises one or more of:
measurement performance of an intra-frequency neighboring cell;
measurement performance of an intra-frequency neighboring cell that satisfies the measurement condition;
measurement performance of an inter-frequency cell;
measurement performance of an inter-frequency cell that satisfies the measurement condition;
measurement performance of an inter-radio access technology (RAT) cell;
measurement performance of an inter-RAT cell that satisfies the measurement condition;
measurement performance of a cell of a preset group;
measurement performance of a cell of a preset group that satisfies the measurement condition;
measurement performance of a cell corresponding to a frequency of a preset group;
measurement performance of a cell corresponding to a frequency of a preset group that satisfies the measurement condition;
measurement performance of a cell corresponding to a RAT of a preset group; and
measurement performance of a cell corresponding to a RAT of a preset group that satisfies the measurement condition.

9. The measurement method according to claim 1, wherein
the measurement condition is specified by a protocol; or
the measurement condition is a predefined condition; or the measurement condition is configured by the network side.

10. The measurement method according to claim 1, wherein the measurement performance includes: reference signal received power (RSRP), reference signal received quality (RSRQ), signal to interference plus noise ratio (SINR), channel quality indication (CQI).

11. A terminal, comprising a processor, a memory, and a program stored in the memory and capable of running on the processor, wherein the processor is configured to:
  perform neighboring cell and/or inter-frequency measurement only when a cell and/or a frequency satisfies a measurement condition, to obtain a measurement result; and
  report part or all content of the measurement result to a network side when the part or all content of the measurement result satisfies a measurement reporting condition;
  wherein the measurement condition comprises:
  measurement performance of a serving cell is greater than or less than a preset threshold;
  measurement performance of an intra-frequency neighboring cell is greater than or less than a preset threshold;
  a quantity of cells whose measurement performance is less than or greater than a preset threshold in intra-frequency neighboring cells is greater than or less than a preset quantity;
  measurement performance of a cell of a preset group is greater than or less than a preset threshold;
  a quantity of cells whose measurement performance is less than or greater than a preset threshold in cells of a preset group is greater than or less than a preset quantity;
  measurement performance of an inter-frequency cell is greater than or less than a preset threshold;
  a quantity of cells whose measurement performance is less than or greater than a preset threshold in inter-frequency cells is greater than or less than a preset quantity;
  measurement performance of a frequency of a preset group is greater than or less than a preset threshold;
  a quantity of cells whose measurement performance is less than or greater than a preset threshold on frequencies of a preset group is greater than or less than a preset quantity;
  measurement performance of an inter-radio access technology (RAT) cell is greater than or less than a preset threshold;
  a quantity of cells whose measurement performance is less than or greater than a preset threshold in inter-RAT cells is greater than or less than a preset quantity;
  measurement performance in a RAT of a preset group is greater than or less than a preset threshold;
  a quantity of cells whose measurement performance is less than or greater than a preset threshold in RATs of a preset group is greater than or less than a preset quantity.

12. The terminal according to claim 11, wherein the processor is configured to, before performing neighboring cell and/or inter-frequency measurement only when the cell and/or the frequency satisfies the measurement condition, to obtain the measurement result,
  receive the measurement condition from the network side; or
  receive a measurement configuration and the measurement condition corresponding to the measurement configuration from the network side.

13. The terminal according to claim 11, wherein a measurement range corresponding to the measurement condition comprises at least one of:
  one or more cells;
  one or more cell groups;
  one or more frequencies;
  one or more frequency ranges;
  one or more frequency groups;
  one or more frequency range groups;
  one or more radio access technologies (RAT);
  one or more measurement performance;
  one or more reference signals;
  one or more reference signal sets; and
  one or more beams.

14. The terminal according to claim 11, wherein the processor is configured to perform any one or a combination of:
  performing measurement on an intra-frequency neighboring cell;
  performing measurement on an inter-frequency cell;
  performing measurement on an inter-radio access technology (RAT) cell;
  performing measurement on a cell of a preset group;
  performing measurement on a frequency of a preset group;
  performing measurement on a first preset quantity of cells;
  performing measurement on a second preset quantity of frequencies; and
  performing measurement on a cell, frequency, and/or RAT that satisfy/satisfies the measurement condition.

15. The terminal according to claim 14, wherein the processor is configured to:
  perform measurement on a reference signal, a reference signal set, and/or a beam in the intra-frequency neighboring cell;
  or
  perform measurement on a reference signal, a reference signal set, and/or a beam in the inter-frequency cell;
  or
  perform measurement on a reference signal, a reference signal set, and/or a beam in the inter-RAT cell;
  or
  perform measurement on a reference signal, a reference signal set, and/or a beam in the cell of the preset group;
  or
  perform measurement on a reference signal, a reference signal set, and/or a beam corresponding to a cell that is detected on the frequency of the preset group;
  or
  perform measurement on a reference signal, a reference signal set, and/or a beam corresponding to a cell that is detected in the RAT satisfying the measurement condition.

16. The terminal according to claim 11, wherein before the reporting the part or all content of the measurement result to the network side when the part or all content of the measurement result satisfies a measurement reporting condition, the program is executed by the processor to perform:
  receiving the measurement reporting condition from the network side;
  or receiving a measurement configuration and a measurement reporting condition corresponding to the measurement configuration from the network side.

17. The terminal according to claim 16, wherein the measurement reporting condition comprises one of:
   measurement performance of a serving cell is greater than or less than a first preset threshold;
   measurement performance of an intra-frequency neighboring cell is greater than or less than a second preset threshold;
   a quantity of cells whose measurement performance is less than or greater than a third preset threshold in intra-frequency neighboring cells is greater than a third preset quantity;
   a quantity of cells whose measurement performance is less than or greater than the third preset threshold in the intra-frequency neighboring cells is less than the third preset quantity;
   measurement performance of a cell of a preset group is greater than or less than a fourth preset threshold;
   a quantity of cells whose measurement performance is less than or greater than a fifth preset threshold in cells of a preset group is greater than a fourth preset quantity;
   a quantity of cells whose measurement performance is less than or greater than the fifth preset threshold in the cells of the preset group is less than the fourth preset quantity;
   measurement performance of an inter-frequency cell is greater than or less than a sixth preset threshold;
   a quantity of cells whose measurement performance is less than or greater than a seventh preset threshold in inter-frequency cells is greater than a fifth preset quantity;
   a quantity of cells whose measurement performance is less than or greater than the seventh preset threshold in the inter-frequency cells is less than the fifth preset quantity;
   measurement performance of a frequency of a preset group is greater than or less than an eighth preset threshold;
   a quantity of cells whose measurement performance is less than or greater than a ninth preset threshold on frequencies of a preset group is greater than a sixth preset quantity;
   a quantity of cells whose measurement performance is less than or greater than the ninth preset threshold on the frequencies of the preset group is less than the sixth preset quantity;
   measurement performance of an inter-RAT cell is greater than or less than a tenth preset threshold;
   a quantity of cells whose measurement performance is less than or greater than an eleventh preset threshold in inter-RAT cells is greater than a seventh preset quantity;
   a quantity of cells whose measurement performance is less than or greater than the eleventh preset threshold in the inter-RAT cells is less than the seventh preset quantity;
   measurement performance in a RAT of a preset group is greater than or less than a twelfth preset threshold;
   a quantity of cells whose measurement performance is less than or greater than a thirteenth preset threshold in RATs of a preset group is greater than an eighth preset quantity; and
   a quantity of cells whose measurement performance is less than or greater than the thirteenth preset threshold in the RATs of the preset group is less than the eighth preset quantity.

18. The terminal according to claim 11, wherein the part or all content of the measurement result comprises one or more of:
   measurement performance of an intra-frequency neighboring cell;
   measurement performance of an intra-frequency neighboring cell that satisfies the measurement condition;
   measurement performance of an inter-frequency cell;
   measurement performance of an inter-frequency cell that satisfies the measurement condition;
   measurement performance of an inter-radio access technology (RAT) cell;
   measurement performance of an inter-RAT cell that satisfies the measurement condition;
   measurement performance of a cell of a preset group;
   measurement performance of a cell of a preset group that satisfies the measurement condition;
   measurement performance of a cell corresponding to a frequency of a preset group;
   measurement performance of a cell corresponding to a frequency of a preset group that satisfies the measurement condition;
   measurement performance of a cell corresponding to a RAT of a preset group; and
   measurement performance of a cell corresponding to a RAT of a preset group that satisfies the measurement condition.

19. The terminal according to claim 11, wherein the measurement performance includes: reference signal received power (RSRP), reference signal received quality (RSRQ), signal to interference plus noise ratio (SINR), channel quality indication (CQI).

20. A non-transitory computer-readable storage medium, wherein the non-transitory computer-readable storage medium stores a computer program, and the computer program is executed by a processor to perform:
   performing neighboring cell and/or inter-frequency measurement only when a cell and/or a frequency satisfies a measurement condition, to obtain a measurement result; and
   reporting part or all content of the measurement result to a network side when the part or all content of the measurement result satisfies a measurement reporting condition;
   wherein the measurement condition comprises:
   measurement performance of a serving cell is greater than or less than a preset threshold;
   measurement performance of an intra-frequency neighboring cell is greater than or less than a preset threshold;
   a quantity of cells whose measurement performance is less than or greater than a preset threshold in intra-frequency neighboring cells is greater than or less than a preset quantity;
   measurement performance of a cell of a preset group is greater than or less than a preset threshold;
   a quantity of cells whose measurement performance is less than or greater than a preset threshold in cells of a preset group is greater than or less than a preset quantity;
   measurement performance of an inter-frequency cell is greater than or less than a preset threshold;

a quantity of cells whose measurement performance is less than or greater than a preset threshold in inter-frequency cells is greater than or less than a preset quantity;

measurement performance of a frequency of a preset group is greater than or less than a preset threshold;

a quantity of cells whose measurement performance is less than or greater than a preset threshold on frequencies of a preset group is greater than or less than a preset quantity;

measurement performance of an inter-radio access technology (RAT) cell is greater than or less than a preset threshold;

a quantity of cells whose measurement performance is less than or greater than a preset threshold in inter-RAT cells is greater than or less than a preset quantity;

measurement performance in a RAT of a preset group is greater than or less than a preset threshold;

a quantity of cells whose measurement performance is less than or greater than a preset threshold in RATs of a preset group is greater than or less than a preset quantity.

\* \* \* \* \*